United States Patent
Kazmi et al.

(10) Patent No.: US 10,194,336 B2
(45) Date of Patent: Jan. 29, 2019

(54) ACTIVATION OF CELLS

(71) Applicant: Telefonaktiebolaget LM Ericsson (Publ), Stockholm (SE)

(72) Inventors: Muhammad Kazmi, Bromma (SE); Joakim Axmon, Kävlinge (SE); Mattias Bergström, Stockholm (SE); Imadur Rahman, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 119 days.

(21) Appl. No.: 15/301,888

(22) PCT Filed: Jun. 9, 2016

(86) PCT No.: PCT/SE2016/050562
§ 371 (c)(1),
(2) Date: Oct. 4, 2016

(87) PCT Pub. No.: WO2017/030478
PCT Pub. Date: Feb. 23, 2017

(65) Prior Publication Data
US 2018/0192300 A1    Jul. 5, 2018

Related U.S. Application Data

(60) Provisional application No. 62/205,935, filed on Aug. 17, 2015.

(51) Int. Cl.
*H04W 16/32* (2009.01)
*H04L 5/00* (2006.01)
(Continued)

(52) U.S. Cl.
CPC .......... *H04W 16/32* (2013.01); *H04B 17/309* (2015.01); *H04L 1/0027* (2013.01);
(Continued)

(58) Field of Classification Search
CPC ... H04W 16/32; H04W 84/045; H04W 74/08; H04W 74/04; H04B 17/309
See application file for complete search history.

(56) References Cited

U.S. PATENT DOCUMENTS

2012/0176924 A1* 7/2012 Wu .................. H04W 72/0406
370/252
2013/0237208 A1* 9/2013 Vujcic ............... H04B 7/15507
455/418

(Continued)

OTHER PUBLICATIONS

International Search Report and Written Opinion dated Sep. 2, 2016 for International Application Serial No. PCT/SE2016/050562, International Filing Date—Jun. 9, 2016 consisting of 15-pages.

(Continued)

*Primary Examiner* — Thai Nguyen
(74) *Attorney, Agent, or Firm* — Christopher & Weisberg, P.A.

(57) ABSTRACT

The disclosure relates to a method performed in a wireless device served by a network node of a radio communications system. The wireless device is capable of carrier aggregation and is configured by the network node with a primary cell, PCell, and a first secondary cell, SCell. The method comprises receiving an activation command for activating the first SCell. The method also comprises performing a first activation procedure for activating the first SCell in response to the activation command, over a variable time period increasing with a number of times that a discovery reference signal occasion of the first SCell is not available at the wireless device during the first activation procedure. The disclosure also relates to the corresponding method in the network node as well as the wireless device and the network node.

30 Claims, 7 Drawing Sheets

Receive an SCell or carrier activation or deactivation command for activating or deactivating the first SCell or the first carrier — 610

Activate the first SCell or first carrier over a variable time period (T0), provided at least N number of DL time resources containing DRS are available over T0 — 620

(51) Int. Cl.
  *H04L 27/00*    (2006.01)
  *H04W 16/14*    (2009.01)
  *H04L 1/00*     (2006.01)
  *H04B 17/309*   (2015.01)
  *H04W 74/04*    (2009.01)
  *H04W 74/08*    (2009.01)
  *H04W 84/04*    (2009.01)

(52) U.S. Cl.
  CPC .............. *H04L 5/001* (2013.01); *H04L 5/005* (2013.01); *H04L 5/0098* (2013.01); *H04L 27/0006* (2013.01); *H04W 16/14* (2013.01); *H04L 1/0026* (2013.01); *H04L 5/0057* (2013.01); *H04W 74/04* (2013.01); *H04W 74/08* (2013.01); *H04W 84/045* (2013.01)

(56) References Cited

U.S. PATENT DOCUMENTS

2016/0073366 A1* 3/2016 Ng .................. H04W 56/001 370/329
2017/0245168 A1* 8/2017 Yi .................... H04W 24/10

OTHER PUBLICATIONS

3GPP TSG RAN WG1#81, R1-153183, "Title: Further Discussions on Physical Layer Options for LAA-LTE," Agenda Item: 6.2.4.3, Document for Discussion, Source: Motorola Mobility, Conference Location and Date: Fukuoka, Japan, Apr. 25 through May 29, 2015 consisting of 7-pages.

3GPP TSG RAN WG1#81, R1-152867, "Title: Discussion on RRM for LAA," Agenda Item: 6.2.4.3, Document for Discussion and Decision, Source: Samsung, Conference Location and Date: Fukuoka, Japan, May 25-29, 2015 consisting of 4-pages.

3GPP TR 36.889 V13.0.0 (Jun. 2015) 3rd Generation Partnership Project; Technical Specification Group Radio Access Network; Study on Licensed-Assisted Access to Unlicensed Spectrum; (Release 13) Jul. 3, 2015 consisting of 285-pages.

3GPP TS 36.321 V12.6.0 (Jun. 2015) 3rd Generation Partnership Project; Technical Specification Group Radio Access Network; Evolved Universal Terrestrial Radio Access (E-UTRA); Medium Access Control (MAC) Protocol Specification (Release 12) Jul. 8, 2015 consisting of 77-pages.

3GPP TSG RAN WG1#82, R1-154575, "Title: DRS Design for LAA," Agenda Item: 7.2.4.2.1, Document for Discussion/Decision, Source: Alcatel-Lucent, Alcatel-Lucent Shanghai Bell., Conference Location and Date: Beijing, China, Aug. 24-28, 2015 consisting of 5-pages.

3GPP TSG RAN WG1#82, R1-154648, "Title: Enhanced DRS for LAA," Agenda Item: 7.2.4.2.1, Document for Discussion and Decision, Source: MediaTek Inc., Conference Location and Date: Beijing, China, Aug. 24-28, 2015 consisting of 9-pages.

3GPP TSG RAN WG1#82, R1-154674, "Title: LAA DRS Transmission and Design," Agenda Item: 7.2.4.2.1, Document for Discussion/Decision, Source: Wilus Inc., Conference Location and Date: Beijing, China, Aug. 24-28, 2015 consisting of 4-pages.

* cited by examiner

ACTIVATION OF CELLS

CROSS-REFERENCE TO RELATED APPLICATIONS

This Application is a Submission Under 35 U.S.C. § 371 for U.S. National Stage Patent Application of International Application No. PCT/SE2016/050562, filed Jun. 9, 2016 entitled "ACTIVATION OF CELLS," which claims priority to U.S. Provisional Application No. 62/205,935, filed Aug. 17, 2015, entitled "ACTIVATION PROCEDURES OF LTE SERVING CELLS IN UNLICENSED SPECTRUM," the entirety of both which are incorporated herein by reference.

TECHNICAL FIELD

The disclosure relates to a wireless device capable of carrier aggregation and configured by a network node with a primary cell, PCell, and a secondary cell, SCell, to a corresponding network node, as well as to methods performed therein.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs.

Furthermore, High Speed Downlink Packet Access (HSDPA) and High Speed Uplink Packet Access (HSUPA), together referred to as High Speed Packet Access (HSPA), are mobile communication protocols that were developed to cope with higher data rates than original Wideband Code Division Multiple Access (WCDMA) protocols for UMTS were capable of.

The Universal Terrestrial Radio Access Network (UTRAN) is the radio access network of a UMTS and Evolved UTRAN (E-UTRAN) is the radio access network of an LTE system. In an UTRAN and an E-UTRAN, a User Equipment (UE) is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to a UE and receiving signals transmitted by a UE. In UMTS, a Radio Network Controller (RNC) controls the NodeB, and is, among other things, in charge of management of radio resources in cells for which the RNC is responsible. The RNC and its corresponding NodeBs are called the Radio Network Subsystem (RNS). The RNC is in turn also connected to the Core Network (CN). In LTE, the eNodeB manages the radio resources in the cells, and is directly connected to the CN, as well as to neighboring eNodeBs via an X2 interface.

FIG. 1 illustrates an example deployment of a radio access network in an LTE system. An eNB 101a serves a UE 103 located within the RBS's geographical area of service or serving cell 105a. The eNB 101a is in this example connected via an X2 interface to a neighboring eNB 101b serving another cell 105b.

Multi-Carrier or Carrier Aggregation Concept

The LTE Rel-10 specifications have been standardized, supporting Component Carrier (CC) bandwidths up to 20 MHz, which is the maximal LTE Rel-8 carrier bandwidth. An LTE Rel-10 operation wider than 20 MHz is possible and appears as a number of LTE CCs to an LTE Rel-10 terminal. The straightforward way to obtain bandwidths wider than 20 MHz is by means of Carrier Aggregation (CA). CA implies that an LTE Rel-10 terminal can receive multiple CCs, where the CCs have or at least have the possibility to have, the same structure as a Rel-8 carrier. CA is illustrated in FIG. 2, where five 20 MHz CCs are aggregated totaling 100 MHz. In CA operation the UE is thus able to receive and/or transmit data from and to more than one cell. In other words, a CA capable UE can be configured to operate with more than one serving cell. A carrier of each serving cell is generally called a CC. The CC is thus an individual carrier in a multi-carrier system. A CA system may alternatively be called a multi-carrier system, a multi-cell operation system, multi-carrier operation system, or a multi-carrier transmission and/or reception system. CA is used for transmission of signaling and data in the uplink and downlink directions. One of the CCs is designated as the primary component carrier (PCC). A PCC may also be referred to as a primary carrier, an anchor carrier, a primary cell (PCell), or a primary serving cell (PSC). The remaining CCs are designated as secondary component carriers (SCC). An SCC may also be referred to as a secondary carrier, a supplementary carrier, a secondary cell (SCell), or a secondary serving cell (SSC).

Generally, the PCell carries the essential UE specific signaling and is the carrier where the UE performs radio link monitoring. The PCell exists in both uplink and downlink directions in CA. In case there is a single UL CC the PCell must be on that CC. The network may assign different PCells to different UEs operating in an area within radio coverage of the same sector or cell.

Multi-Carrier SCell Setup or Release Procedure

A multi-carrier SCell setup refers herein to a procedure which enables the network node to at least temporarily setup or release the use of an SCell, in downlink (DL) and/or uplink (UL) by the CA capable UE. Herein the SCell setup or release procedure or command can comprise one or more of the following:

Configuration of SCell(s) also known as SCell addition (setup)
    De-configuration of SCell(s) also known as SCell release (release)
    Activation of SCell(s) (setup)
    Deactivation of SCell(s) (release)

Configuration and De-Configuration of SCell

The configuration procedure of an SCell, i.e. addition/release of SCell, is used by the serving radio network node, e.g., eNodeB in LTE or NodeB in HSPA, to configure a CA-capable UE with one or more SCells, e.g., with DL SCell, UL SCell or both. On the other hand, the de-configuration procedure is used by the serving radio network node or RBS (eNodeB or NodeB) to de-configure or remove one or more already configured SCells, e.g., DL SCell, UL SCell or both. The configuration or de-configuration procedure is also used to change the current multi-carrier configuration, e.g., for increasing or decreasing the number of SCells or for swapping the existing SCells with new ones. The configuration and de-configuration are done by the eNodeB and by RNC using Radio Resource Control (RRC) signaling in LTE and HSPA respectively.

Activation and Deactivation of Secondary Cells

The serving radio network node, e.g., eNodeB in LTE or NodeB in HSPA, can activate one or more deactivated SCells or deactivate one or more active SCells on the corresponding configured secondary carriers. The PCell is always activated. The configured SCells are initially deactivated upon addition and after a cell change, e.g., a handover. In HSPA the activation and deactivation command is sent by the NodeB via a High Speed-Shared Control Channel (HS-SCCH). In LTE the activation and deactivation command is sent by the eNodeB via a Media Access Control (MAC) control element (MAC-CE). The deactivation of SCell saves UE battery power.

In the existing solutions, SCell activation and deactivation delay requirements exist only for one SCell as explained below:

A. SCell activation delay: The delay within which the UE shall be able to activate the deactivated SCell depends upon the specified conditions and also on the number of CCs supported by the UE. Upon receiving SCell activation command in subframe n, the UE shall be capable to transmit a valid Channel State Information (CSI) report for the SCell being activated no later than in subframe n+24, provided certain pre-defined conditions are met for the SCell and the UE is configured with one SCell. Otherwise upon receiving the SCell activation command in subframe n, the UE shall be capable to transmit a valid CSI report for the SCell being activated no later than in subframe n+34 provided the SCell can be successfully detected on the first attempt and is configured with one SCell. The valid CSI is based on the UE measurement and corresponds to any pre-defined Channel Quality Indicator (CQI) value with the exception of CQI index=0 (meaning out of range). In case the UE is configured with two or more SCells then the activation delay can be longer than 24 subframes or 34 subframes.

B. SCell deactivation delay: Upon receiving SCell deactivation command or upon expiry of the sCellDeactivationTimer in subframe n, the UE shall accomplish the deactivation actions for the SCell being deactivated no later than in subframe n+8.

Licensed-Assisted Access (LAA) to Unlicensed Spectrum Using LTE

The unlicensed spectrum, which in, e.g., the 5-6 GHz range can be found between 5150 MHz and 5925 MHz, can be simultaneously used or shared by multiple different technologies, e.g., by LTE and Institute of Electrical and Electronics Engineers (IEEE) Wi-Fi. The LAA intends to allow LTE equipment to also operate in an unlicensed radio spectrum. Note that, the same LAA concept can be used in other spectrum too, such as in the 3.5 GHz range in North America. In LAA mode, devices connect in the licensed spectrum to a primary cell or PCell, and use CA to benefit from additional transmission capacity in the unlicensed spectrum via a secondary cell or SCell. Therefore, the UE can be configured with one or more SCells in the unlicensed spectrum.

Since the unlicensed spectrum must be shared with other wireless technologies (e.g., Wi-Fi, radar, Bluetooth, fixed satellite system), a so called Listen-Before-Talk (LBT) method needs to be applied. LBT involves sensing the medium for a pre-defined minimum amount of time to determine whether there is a transmission or not and thus whether the channel is busy or not, and backing off if the channel is busy. There will thus be no transmission if there already is a transmission on the channel. FIG. 3 illustrates LAA to unlicensed spectrum using LTE CA, with an UL and DL PCell operating on licensed spectrum and an SCell operating on unlicensed spectrum.

Listen-Before-Talk (LBT)

According to the LBT procedure the transmitter or transmitting node that wishes to transmit in unlicensed spectrum (e.g., the radio base station in case of DL or the UE or wireless device in case of UL) needs to listen on the carrier before it starts to transmit. If the medium is free the transmitter can transmit, while if the medium is busy, e.g., some other node is transmitting, the transmitting node cannot transmit and the transmitting node may try again at a later time. Therefore, the LBT procedure enables a Clear Channel Assessment (CCA) check before using the channel. Based on the CCA, if the channel is found to be clear then then LBT is considered to be successful. But if the channel is found to be occupied then the LBT is considered to be a failure also known as an LBT failure. The LBT failure requires the transmitting node not to transmit signals in the same and/or subsequent subframes. Exact subframes and also number of subframes where transmission is forbidden depends on the specific design of the LBT scheme.

Due to LBT, a transmission in an unlicensed band may be delayed until the medium or channel becomes free again. And in case there is no coordination between the transmitting nodes (which is often the case) the delay may appear randomly.

In the simplest form, LBT is performed periodically with a period equal to certain units of time. As an example, one unit of time may be one Transmission Time Interval (TTI), one timeslot, or one subframe. The duration of listening in LBT is typically in the order of a few to tens of µseconds. Typically, for LBT purpose, each LTE subframe is divided in two parts: in the first part, the listening takes place and the second part carries data if the channel is seen to be free. The listening occurs at the beginning of the current subframe and determines whether or not data transmission will continue in this subframe and a few next subframes. Hence, the data transmission in a subframe P until subframe P+n is determined by the outcome of listening during the beginning of subframe P. The number n depends on system design and/or on regulatory requirements.

Discovery Reference Signal

The Discovery Reference Signal (DRS) is any type of reference or pilot signal which is pre-defined or pre-configured at the UE. In LAA, DRS in the downlink may be used for enabling the UE to perform functions such as channel estimation, synchronization to a cell, Automatic Frequency Control (AFC), Automatic Gain Control (AGC), and radio measurements. Examples of radio measurements are cell search, Reference Signal Received Power (RSRP) or Reference Signal Received Quality (RSRQ) measurements, positioning measurement, or CSI measurements. Examples of CSI measurements are CQI, Rank Indicator (RI), Precoding Matrix Indicator (PMI) measurements.

The transmissions of the DRS occur in DRS occasions. The DRS may comprise, e.g., the Primary Synchronization Signal (PSS), Secondary Synchronization Signal (SSS), Cell Reference Signal (CRS), and CSI-Reference Signal (CSI-RS). The UE is configured with a Discovery Measurement Timing Configuration (DMTC) which is a time window within which the UE can receive the DRS. The DMTC provides a window with a duration (e.g., between 1-6 ms), also known as DRS occasion, occurring with a certain periodicity and timing within which the UE may expect to receive discovery signals or DRS. Examples of DRS occasion periodicity are 40, 80, or 160 ms.

Due to LBT, there will be some instances or occasions where the transmitting network node is unable to transmit DRS. Thus, DRS will not be transmitted in every DRS occasion. If LBT is applied to DRS transmissions, there will be some instances where the DRS is not able to be transmitted in a periodic manner as in the case of the Rel-12 DRS transmitted on a cell in licensed spectrum. The following two options may then be considered for DRS design for LAA, as described in 3GPP TR 36.889 version 13.0.0, 2015-06.
1. Subject to LBT, DRS is transmitted in a fixed time position within the configured DMTC;
2. Subject to LBT, DRS is allowed to be transmitted in at least one of different time positions within the configured DMTC The two alternatives above are shown in FIG. 4, referred to as Alt.1 and Alt.2 respectively.

Standalone Access of Unlicensed Spectrum Using LTE

There will also be LTE systems operating in unlicensed spectrum completely in a standalone manner. The difference between LAA and standalone LTE will be that there will not be any licensed carrier to be aggregated with the unlicensed carrier in standalone usage, while an unlicensed LTE is always aggregated with licensed carrier in LAA operations. Standalone operation means that the UL will also be allowed in unlicensed spectrum usage of LTE. Since there will not be any support from a licensed carrier, the standalone LTE system is responsible for all functionalities in unlicensed spectrum.

In a standalone operation, a UE may be capable of using a single unlicensed carrier, or may be capable of aggregating more than one unlicensed carriers. In the latter case, both PCell and SCell(s) will be in unlicensed spectrum.

LAA Operation in Dual Connectivity Mode

In LAA, the unlicensed carrier can also be aggregated with a licensed carrier in a dual connectivity manner. In Dual Connectivity (DC) mode, at least one CC in a Master eNodeB (MeNB) is termed as PCell and at least one CC in a Secondary eNodeB (SeNB) is termed as PSCell. PCell and PSCell are functionally similar nodes. However, activation/deactivation/configuration/deconfiguration of PSCell is controlled by a PCell. The connected nodes in DC operation are independent to each other, thus, all control signaling is done separately.

Problem Description

In e.g. LAA or standalone LTE access of unlicensed spectrum, one or more CCs may belong to an unlicensed frequency band (e.g., in the 5 GHz range). The unlicensed frequency band can be shared between multiple wireless devices of different operators. To allow fair sharing of spectrum, mechanisms such as LBT will be applied on CCs of the unlicensed band. When CA is applied for PCell and SCell(s), an SCell on any CC can be configured, de-configured, activated, or deactivated at the UE by the network node, e.g., the eNodeB. As stated above, due to LBT some of the DRS signals may not be transmitted by the network node, or may be delayed, as the channel or medium may be busy by other transmissions in the DRS occasion. If the SCell (or a standalone carrier) is operating in the unlicensed band the UE may not be able to fulfil the requirements (e.g., delays) associated with e.g. cell activation procedures due to the LBT procedure, since the UE uses DRS to achieve synchronization.

SUMMARY

It is therefore an object to address some of the problems outlined above, and to provide a solution for allowing accurate activation of an SCell. A new activation procedure ensuring that the UE is able to activate an SCell even when LBT is applied on that SCell is provided.

According to aspects, a method performed by a network node such as the eNodeB, as well as a corresponding method performed by a wireless device such as a UE are provided. Furthermore, a network node and a wireless device are provided. According to further aspects, the object is achieved by computer programs and computer program products corresponding to the aspects above.

According to a first aspect, a method performed in a wireless device served by a network node of a radio communications system is provided. The wireless device is capable of carrier aggregation and is configured by the network node with a primary cell, PCell, and a first secondary cell, SCell. The method comprises receiving an activation command for activating the first SCell. The method also comprises performing a first activation procedure for activating the first SCell in response to the activation command, over a variable time period. The variable time period increases with a number of times that a discovery reference signal occasion of the first SCell is not available at the wireless device during the first activation procedure.

According to a second aspect, a method performed in a network node of a radio communications system is provided. The network node is serving a wireless device capable of carrier aggregation. The network node has configured the wireless device with a primary cell, PCell, and a secondary cell, SCell. The method comprises transmitting an activation command to the wireless device for activating the SCell. The method also comprises receiving from the wireless device, a valid Channel State Information, CSI report for the SCell in response to the activation command, wherein the CSI report is received within a variable time period from the transmission of the activation command, the variable time period increasing with a number of times that a discovery reference signal occasion of the SCell is not available at the wireless device.

According to a third aspect, a wireless device configured to be served by a network node of a radio communications system is provided. The wireless device is capable of carrier aggregation and is configurable by the network node with a primary cell, PCell, and a first secondary cell, SCell. The wireless device is further configured to receive an activation command for activating the first SCell, and to perform a first activation procedure for activating the first SCell in response to the activation command, over a variable time period. The variable time period is increasing with a number of times that a discovery reference signal occasion of the first SCell is not available at the wireless device during the first activation procedure.

According to a fourth aspect, a network node for a radio communications system is provided. The network node is configured to serve a wireless device capable of carrier aggregation, and to configure the wireless device with a primary cell, PCell, and a secondary cell, SCell. The network node is further configured to transmit an activation command to the wireless device for activating the SCell. The network node is also configured to receive, from the wireless device, a valid Channel State Information, CSI, report for the SCell in response to the activation command. The CSI report is received within a variable time period from the transmission of the activation command, the variable time period increasing with a number of times that a discovery reference signal occasion of the SCell is not available at the wireless device.

Advantages of embodiments are that a new activation procedure ensures that the UE is able to accurately activate an SCell such that the SCell can be used for scheduled transmissions, while meeting requirements such as activation delay requirements for the SCell.

Other objects, advantages and features of embodiments will be explained in the following detailed description when considered in conjunction with the accompanying drawings and claims.

DETAILED DESCRIPTION

Figure 1:
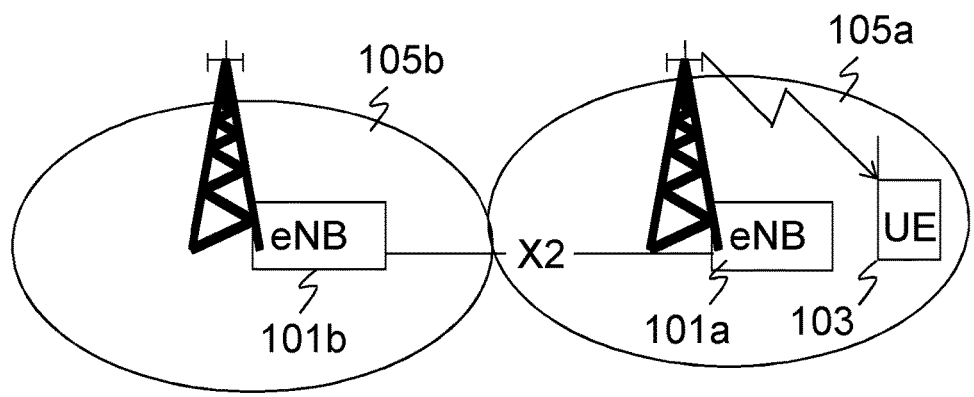
FIG. 1 is a schematic illustration of an E-UTRAN.
Figure 2:
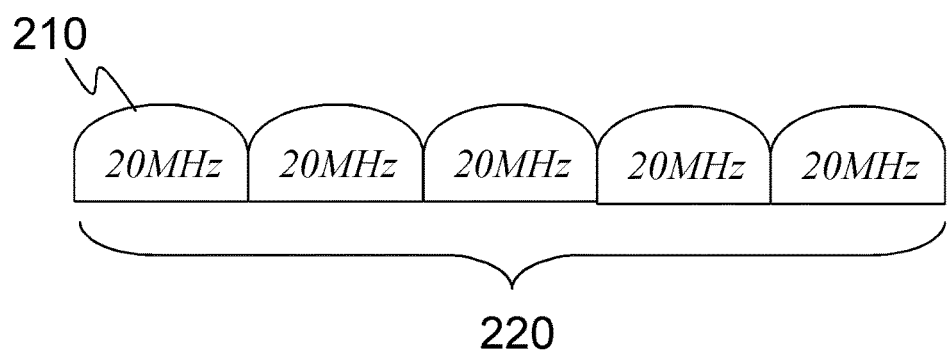
FIG. 2 is a schematic illustration of CA.
Figure 3:
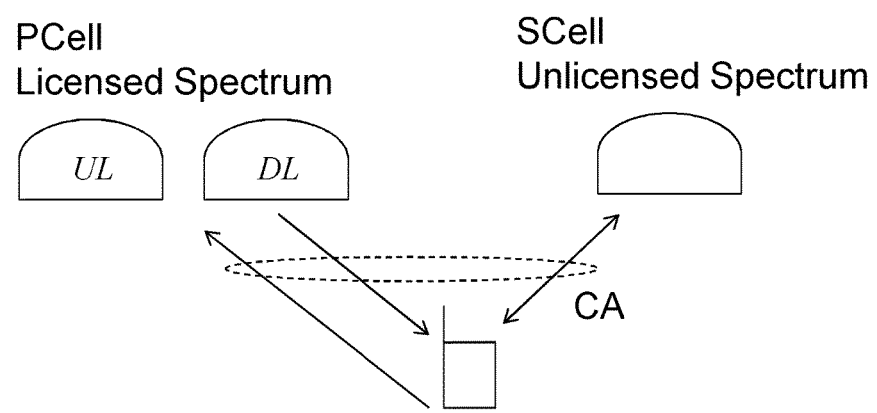
FIG. 3 is a schematic illustration of LAA.
Figure 4:
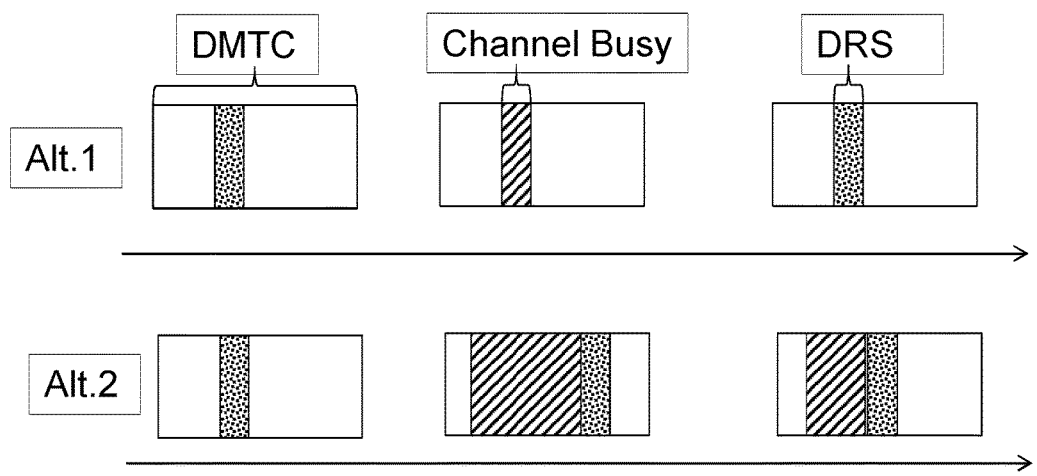
FIG. 4 is a schematic illustration of LAA DRS design options.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of a method and a node, they may also be embodied in a computer program product as well as in a system comprising a computer processor and a memory coupled to the processor, wherein the memory is encoded with one or more programs that may perform the functions disclosed herein.

In some embodiments the non-limiting term UE is used as an example of a wireless device. The UE herein can be any type of wireless device capable of communicating with a network node or another UE over radio signals. The UE may also be a radio communication device, a target device, a device to device (D2D) UE, a machine type UE or a UE capable of machine to machine communication, a sensor equipped with a UE, a tablet, a mobile terminal, a smart phone, a laptop embedded equipment (LEE), a laptop mounted equipment (LME), USB dongles, or Customer Premises Equipment (CPE).

Also in some embodiments a generic terminology "network (NW) node" is used. This can be any kind of network node such as a: base station, radio base station, base transceiver station, base station controller, network controller, evolved NodeB, NodeB, RNC, relay node, positioning node, E-SMLC, location server, repeater, access point, radio access point, Remote Radio Unit (RRU) Remote Radio Head (RRH), multi-standard radio (MSR) radio node such as MSR BS nodes in distributed antenna system (DAS), SON node, O&M, OSS, MDT node, Core network node, or MME.

The embodiments are applicable to any Radio Access Technology (RAT) or multi-RAT systems, which involve measurement without gaps and/or multi-carrier operation, e.g., LTE FDD/TDD, WCDMA/HSPA, GSM/GERAN, Wi Fi, CDMA2000 etc. The embodiments are also applicable to procedures or radio operations performed by the UE in any RRC state, e.g., RRC connected state, CELL_DCH state, idle state, idle mode, CELL_PCH, URA_PCH, CELL_FACH.

Hereinafter, the implication of a certain aspect of CA related requirements in LAA is described. Requirements for LAA SCells operating with only DL transmissions may be developed. This means that UL will only be in licensed spectrum i.e. PCell in licensed and SCells with DL only in unlicensed spectrum. This also means that apart from the measurement requirements, the CA specific requirements for SCell activation and deactivation delay will have to be defined for the LAA. For performing activation of an SCell, the UE uses PSS/SSS/CRS transmitted by that SCell. The existing SCell activation/deactivation delay requirements related to 3GPP Rel-10 CA are defined under the assumption that PSS/SSS/CRS are available at the UE according to the 3GPP Rel-8 LTE physical layer design. In this case all CCs are on licensed band. However, unlike in Rel-10 CA where PSS/SSS/CRS are sent on regular basis, in LAA—due to the LBT procedure—the DRS signals (i.e. PSS/SSS/CRS) may not be available periodically and regularly. Due to LBT procedure, the SCell activation delay for activating SCell on unlicensed band will not be fully deterministic. Therefore, it may be challenging to define a fixed delay for the SCell activation requirements. Instead the SCell activation delay may have to be defined as a variable duration. For example, the duration can be expressed in terms of certain minimum number of subframes containing DRS available at the UE during the SCell activation procedure. This means that the delay will be longer when there are more rampant LBT failures leading to cessation of DRS transmission in idle periods (i.e. when SCell does not transmit). On the other hand, the SCell deactivation procedure does not require the use of DRS, so the current requirements are likely to be reused for deactivation.

The problem of the UE not being able to activate an SCell in time due to unavailable DRS occasions, e.g. when LBT procedures are used on the SCell, is thus addressed by a solution in which the UE performs activation of an SCell, e.g. on a CC belonging to the unlicensed band (also referred to as a CC for contention-based transmission) within a variable SCell activation delay. The variable SCell activation delay depends on the number of times the DRS of a DRS occasion are missed at the wireless device due to an LBT failure. The LBT failure in a subframe requires the network node to not transmit signals in one or more subframes, which may also contain DRS of a DRS occasion.

Advantages of embodiments are that the wireless device may correctly activate an SCell or a carrier belonging to a CC of an unlicensed spectrum, and that the activation delay of an unlicensed CC or unlicensed carrier is well specified even when DRSs are not contiguously transmitted, e.g., due to LBT.

To further improve the situation during an SCell activation procedure, the network node serving the SCell may in embodiments avoid applying LBT in subframes which contains DRS and which may not be transmitted due to LBT failure. This may also allow the UE to perform SCell activation over a shorter delay.

The description of embodiments of the invention is divided into the following main sections:
1. Description of a scenario involving an SCell activation/deactivation procedure
2. Method in a UE of adapting SCell activation/deactivation procedure based on type of spectrum
3. Method in a network node of adapting SCell activation/deactivation procedure based on type of spectrum 1a. Description of a Scenario Involving SCell Activation/Deactivation with PCell on Licensed Carrier A basic scenario comprises of a UE being served by a first network node with a PCell operating on a first carrier frequency (f1) and the UE is also capable of being served by at least one secondary serving cell (SCell) also known as a first SCell. The UE may further be capable of being served by two SCells: the first SCell and a second SCell. The first SCell operates on a second carrier frequency (f2) and the second SCell operates on a third carrier frequency (f3). The carrier f1 and f3 belongs to a licensed spectrum or band, whereas f2 belongs to an unlicensed spectrum or frequency band.

In an unlicensed spectrum or frequency band, contention based transmission is allowed i.e. two or more devices (UE or network nodes) can access even the same part of spectrum. In this case no operator "owns" the spectrum, or has an exclusive right to use the spectrum. In a licensed spectrum or licensed band only contention free transmission is allowed i.e. only devices (UE or network nodes) allowed by the owner of the spectrum license can access the licensed spectrum.

In some embodiments the UE may also be capable of being served by more than two SCells, e.g., a third SCell operating on carrier frequency (f4) and so on. f4 can be either in a licensed spectrum (or band), or in licensed spectrum (or band).

The carrier f1 is interchangeably called PCC while carriers f2, f3 and f4 may interchangeably be called SCC1, SCC2 and SCC3 respectively.

The term 'served or being served' herein means that the UE is configured with the corresponding serving cell and can receive from and/or transmit data to the network node on the serving cell, e.g., on PCell or any of the SCells. The data is transmitted or received via physical channels, e.g., Physical DL Shared Channel (PDSCH) in DL, and Physical UL Shared Channel (PUSCH) in UL.

The UE may be requested to activate or deactivate one or more SCells as follows:
Receiving a first SCell activation or deactivation request message or command from a second network node for activating or deactivating the first SCell;
Receiving a second SCell activation or deactivation request message or command from a third network node for activating or deactivating the second SCell;
Receiving a third SCell activation or deactivation request message or command from a fourth network node for activating or deactivating the third SCell;

The embodiments are described for at least one SCell on unlicensed spectrum or in some cases for two SCells with one on licensed and one on unlicensed spectrum or frequency bands. However, the embodiments are applicable to any number of SCells whereas at least one SCell operates on a CC belonging to an unlicensed spectrum or frequency band.

In some embodiments, at least some of the first, second, third and fourth network nodes are the same or are co-located at the same site or location. For example, in such embodiments the UE may receive one or more messages or command for activating or deactivating one or more SCells from the first network node. As an example in such embodiments the UE may also receive one or more messages for setting up or releasing one or more SCells from the PCell. In one particular example one eNodeB implementation may comprises of plurality of network nodes.

In some embodiments, any combination of the first, second, third and fourth network nodes are different and may be located at different sites or location or may be logically different nodes that may still be co-located. In such embodiments the UE may receive one or more messages for activating or deactivating one or more SCells from the respective SCells. It may also be so that the UE receives one command/message which addresses multiple SCells, i.e. the command/message may activate and/or deactivate multiple SCells.

In some embodiments the SCell activating or deactivating message or command, or the so called SCell setup or release command, may comprise of one or more of the following:
Activation of the SCell (setup)
Deactivation of the SCell (release)
Configuration of the SCell or SCell addition (setup)
De-configuration of the SCell or SCell release (release)

As described in the background section, an SCell setup comprises a configuration of the SCell. The configured SCells are initially deactivated upon configuration or addition. The configuration is thus followed by an activation. In some embodiments one or more SCell activating or deactivating messages or commands may be received by the UE via RRC signaling. The configuration or addition of an SCell is typically signaled via RRC in LTE. In some embodiments one or more SCell activating or deactivating messages or commands may be received by the UE via MAC CE command. The activation of an SCell is typically signaled via MAC in LTE.

1b. Description of a Scenario Involving Unlicensed Carrier Activation/Deactivation (Standalone Operation)

An alternative scenario comprises a UE that is capable of being served by at least one carrier in unlicensed band also known as a first Cell in unlicensed carrier. This means that the PCell is on a CC belonging to unlicensed band, which is also known as standalone CA operation in unlicensed band. The UE may further be capable of being served by two cells: the first unlicensed carrier and a second unlicensed carrier. The first carrier operates on a first carrier frequency (f1) and the second carrier operates on a second carrier frequency (f2). The carrier f1 and f2 belongs to an unlicensed spectrum or band.

In an unlicensed spectrum or band contention based transmission is allowed i.e. two or more devices (UE or network nodes) can access even the same part of spectrum. In this case no operator "owns" the spectrum. In some embodiments the UE may also be capable of being served by more than two carriers, e.g., a third carrier operating on carrier frequency (f3) and so on. f3 can be either in a licensed spectrum (or band), or in unlicensed spectrum (or band).

The carrier f1 is interchangeably called as PCC while carriers f2 and f3 may interchangeably be called as SCC1 and SCC2 respectively.

The term 'served or being served' herein means that the UE is configured with the corresponding serving cell and can receive from and/or transmit data to the network node on the serving cell, e.g., on PCell or any of the SCells. The data is transmitted or received via physical channels, e.g., PDSCH in DL, PUSCH in UL etc.

The UE may be requested to activate or deactivate one or more carriers as follows:

- Receiving a first carrier activation or deactivation request message or command from a second network node for activating or deactivating the first carrier;
- Receiving a second carrier activation or deactivation request message or command from a second network node for activating or deactivating the second carrier;
- Receiving a third carrier activation or deactivation request message or command from a third network node for activating or deactivating the third carrier;

The embodiments are described for at least one carrier on unlicensed spectrum. However, the embodiments are applicable to any number carriers whereas at least one SCell operates on a CC belonging to an unlicensed spectrum or frequency band.

In some embodiments, at least some of the first, second and third network nodes are the same or are co-located at the same site or location. For example, in such embodiments the UE may receive one or more messages or command for activating or deactivating one or more carriers from the first network node. Also for example in such embodiments the UE may receive one or more messages for setting up or releasing one or more carriers from the first carrier. In one particular example one eNodeB comprises a plurality of the network nodes.

In some embodiments, any combination of the first, second, and third network nodes are different and may be located at different sites or location or may be logically different nodes that may still be co-located. In such embodiments the UE may receive one or more messages for activating or deactivating one or more SCells from the respective SCells. It may also be so that the UE receives one command/message which addresses multiple SCells, i.e. the command/message may activate and/or deactivate multiple SCells.

In some embodiments the carrier activating or deactivating message or command, or the so called SCell setup or release command, may comprise of one or more of the following:

- Activation of the unlicensed carrier (setup)
- Deactivation of the unlicensed carrier (release)
- Configuration of the unlicensed carrier or unlicensed carrier addition (setup)
- De-configuration of the unlicensed carrier or unlicensed carrier release (release)

As described in the background section, an SCell setup comprises a configuration of the SCell. The configured SCells are initially deactivated upon configuration or addition. The configuration is thus followed by an activation. In some embodiments one or more SCell activating or deactivating messages or commands may be received by the UE via RRC signaling. The configuration or addition of an SCell is typically signaled via RRC in LTE. In some embodiments one or more SCell activating or deactivating messages or commands may be received by the UE via MAC CE command. The activation of an SCell is typically signaled via MAC in LTE.

2. Method in a UE of Adapting SCell or Unlicensed Carrier Activation/Deactivation Procedure Based on Type of Spectrum Several embodiments of the method in the UE are described hereinafter, and may be applied in the scenarios described above in section 1a and 1b.

A: First UE Embodiment—Activation of Only SCell(s) or Carriers on Unlicensed Spectrum In a first embodiment related to the UE procedure, the UE receives SCell or unlicensed carrier activation/deactivation command to activate or deactivate one or more SCells where all SCells or unlicensed carriers operate on CCs belonging to unlicensed frequency spectrum or band. In this embodiment it is assumed that all the SCells or unlicensed carriers configured at the UE belong to CCs operating on the unlicensed frequency band. The CCs may belong to the same or different unlicensed bands.

In case the SCell or unlicensed carrier is deactivated then the UE activates that SCell or unlicensed carrier, or performs an activation procedure, in response to the received command. But if the SCell or unlicensed carrier is activated then the UE deactivates that SCell or unlicensed carrier, or performs a deactivation procedure, in response to the received command. The command may indicate, for each cell whether that cell should be in activated state or deactivated state. If the command indicates that a certain cell, which is currently in deactivated state, should be in activated state, then the UE performs the activation procedure for that cell. And vice versa, if the command indicates that a certain cell, which is currently in activated state, should be in deactivated state, then the UE performs the deactivation procedure for that cell. The command may be the SCell Activation/Deactivation MAC CE defined in 3GPP TS 36.321 v12.6.0.

The deactivation of the SCell or unlicensed carrier can be performed using a fixed pre-defined time (e.g., 8 ms after receiving the command) since the UE does not need to use DRS for applying the deactivation procedure.

However, for the activation procedure the UE uses DRS (e.g., PSS/SSS/CRS) for activating the SCell or unlicensed carrier. The UE can use the DRS for activating the SCell or unlicensed carrier only during the occasions when the DRS are available on the SCell or unlicensed carrier being activated. During the activation procedure the UE acquires for instance timing of the SCell or unlicensed carrier. Therefore, the DRS enables the UE to acquire synchronization on the SCell or unlicensed carrier to be activated, perform AGC settling etc. On the SCell or unlicensed carrier, which is on an unlicensed band subject e.g. to the LBT procedure, the DRS may not be consistently or periodically available for the UE in every predefined or preconfigured DRS occasion. This is because DRS may not be transmitted periodically by the network node because of the LBT procedure on the SCell or unlicensed carrier in unlicensed band. Due to aperiodic DRS transmission, and according to the first UE embodiment, the UE initiates the activation procedure and activates the SCell or unlicensed carrier over a variable time period (T0). The time period, T0, is further defined as the duration over which the UE is able to receive at least certain number or instances of DRS signals.

The duration T0 may therefore vary depending on the number of times the LBT procedure required the DRS signals to be dropped/suppressed/not sent for the SCell or unlicensed carrier by the network node. The period T0 generally increases with the number of times (L) the LBT procedure required the DRS signals to be dropped/suppressed/not sent, as this will result in that the DRS occasion is not available at the UE. However, in some cases the T0 may not increase. For example, if the LBT is applied in a DL resource without DRS then the T0 may not necessarily increase since UE does not lose any resource with DRS. As an example the duration T0 can be 100 ms provided no LBT is applied or T0 can be 140 ms provided LBT is applied once during the activation procedure. In case LBT is applied more than once, e.g., K times, the duration T0 may for instance be 100+K*40 ms when TW is not exceeded, and 100+(K+Q)*40 ms when TW is exceeded Q number of times.

When it herein says that the UE is able to receive DL time resources containing DRS, so called DRS occasions, it may be so that the receptions meet certain criteria. E.g., the signal may be received with a certain quality and/or strength. Similarly, the UE is unable to receive DRS occasions when the DRS or the signal received in the DRS occasion is below a quality threshold level and/or a strength threshold level.

According to a first exemplary embodiment, the wireless device is capable of CA and is configured with a PCell. The wireless device is further configured with at least a first SCell which may be operating on a CC belonging to an unlicensed frequency band or spectrum allowing contention-based transmission. The wireless device may be LAA capable or may be capable of standalone unlicensed operation. The method in the wireless device comprises receiving an SCell or carrier activation or deactivation command for activating or deactivating the first SCell or the first carrier. The method further comprises activating the first SCell or first carrier over a variable time period (T0), provided at least N number of DL time resources containing DRS are available over T0. DL time resources containing DRS may be, e.g., subframes or DRS occasions.

The variation of the time period T0 may be subject to different criteria described in the following examples:

In a first example, the UE may activate the SCell or unlicensed carrier provided that it is able to receive at least N number of DL time resources containing DRS signals (e.g., N subframes or DRS occasions), as already described above.

In a second example, the UE may activate the SCell or unlicensed carrier provided that it is able to receive at least N1 number of consecutive DL time resources (e.g., N1 subframes) containing DRS signals within a certain time period (e.g., T0) or within N2 number of DL time resources.
  In one embodiment of this second example, the parameter N1 is signaled to UE from the network, e.g., via the Pcell or an SCell (which may be operating in licensed or unlicensed spectrum/frequency band). If N1 is not signaled from the network, it can be based on mobility, or based on indoor or outdoor cells, or based on knowledge about collocation of cells (e.g., serving cell vs measured cell, and SNR differences between collocated cells), or based on the load on the channel. The information can thus be exploited to define N1.
  In another embodiment of this second example, the parameter N1 can be revised based on previous knowledge. For example, if a UE is not able to activate an unlicensed carrier within N1 subframes, then the PCell or network node can provide a revised number for N1 in the second step. Besides, PCell or network node can use this information to be applied to other UEs.
  In still another embodiment of this second example, the UE can consider measurements done in a previous activation period for the following activation period given that they are valid, for example if a UE obtained N2 subframes in M window, then the UE can combine these measurements with the measurements in the coming window.

In yet a third example, the UE may activate the SCell or unlicensed carrier during T0 provided that at least N number of time resources containing DRS is available during T0 and any two consecutive DL resources containing DRS are at least within a time window (TW), for instance comprising the maximum time the UE can maintain a proper gain state and/or frequency tuning towards the SCell without running AGC and/or AFC. If TW is exceeded the UE may have to use the next available DRS on finding an appropriate gain state and/or fine-tuning the downlink carrier frequency before continuing with the SCell activation procedure.

In another aspect of this embodiment the total SCell or unlicensed carrier activation delay (e.g., duration T0) may also depend on whether the SCell or the unlicensed carrier is known or not to the UE at least at the time the UE receives SCell or unlicensed carrier activation command. When the SCell or the unlicensed carrier is known the SCell or the unlicensed carrier activation delay is typically shorter than that when the SCell or unlicensed carrier is unknown. For example, the SCell or unlicensed carrier is known if following conditions are met:

During certain period before the reception of the SCell or unlicensed carrier activation command:
  the UE has sent a valid measurement report for the SCell or unlicensed carrier being activated and
  the SCell or unlicensed carrier being activated remains detectable.
the SCell or unlicensed carrier being activated remains detectable also during the SCell or unlicensed carrier activation delay.

Otherwise the SCell or unlicensed carrier is considered to be unknown to the UE. If the SCell or unlicensed carrier is unknown, then the UE may also be required to activate SCell or unlicensed carrier within the SCell activation delay provided the UE is able to detect the SCell or unlicensed carrier in the first attempt, i.e., the radio conditions of the SCell or unlicensed carrier should be strong such as SINR of the SCell≥−3 dB.

According to yet another aspect of this embodiment the total SCell or unlicensed carrier activation delay (e.g., duration T0) also depends on the number of SCells or unlicensed carriers configured at the UE. The SCell or unlicensed carrier activation delay may increase with the number of configured SCells or unlicensed carriers. For example, the SCell or unlicensed carrier activation delay for $SCell_j$ or unlicensed carrier j may be increased by the number of times ($C_i$) the other $i^{th}$ SCell or $i^{th}$ unlicensed carrier is activated, deactivated, configured or de-configured while the $SCell_j$ is being activated. This is explained with examples below:
  In one example, if there is only one SCell or unlicensed carrier then the total delay is T0.
  In another example if there are two SCells or unlicensed carriers: SCell1 and SCell2 or carrier1 and carrier2. If SCell2 or carrier2 is activated once during the time when the SCell1 or carrier1 is being activated, then the activation delay of SCell1 or carrier1 will be within duration T0+D. As an example D is 10 ms.
  In a third example also with two SCells or two unlicensed carriers if SCell2 or carrier2 is deactivated once as well as activated once during the time when the SCell1 or carrier1 is being activated, then the activation delay of SCell1 or carrier1 will be within duration T0+D×2. As an example D is 10 ms.

In order to meet the SCell or unlicensed carrier activation delay requirement (i.e. to activate SCell or unlicensed carrier within T0) the UE has to keep track of all or at least sufficient number of the DRS transmissions within T0. The UE also needs to ensure that DRS transmissions missed due to LBT are not mistakenly considered for the activation of that SCell or unlicensed carrier i.e. UE does not perform correlation over DRS during missed DRS transmissions due to LBT. This requires change in UE implementation such as extra processing and memory in the UE. For example, the UE implementation may coordinate between LBT procedure and activation procedure to ensure that the UE uses only valid DRS for the activation of the SCell or unlicensed carrier and also meet the SCell or unlicensed carrier activation delay requirements.

B: Second UE Embodiment—Activation of SCells on Unlicensed and Licensed Carriers in LAA Operations In a second embodiment related to the UE procedure, it is assumed that the UE is configured (or is requested to be configured) with at least one SCell on CC operating on the unlicensed frequency band and at least one SCell on CC operating on the licensed frequency band. The unlicensed CCs may belong to the same or different unlicensed bands and similarly licensed CCs may belong to the same or different licensed bands.

In this embodiment the UE receives SCell activation/deactivation command to activate or deactivate at least one SCell operating on a CC belonging to unlicensed frequency band and/or at least one SCell operating on a CC belonging to licensed frequency band. For simplicity of the description it is assumed that a first SCell and a second SCell are configured and operate on CCs belonging to unlicensed and licensed frequency bands respectively. However, the embodiment is applicable to any number of SCells on unlicensed band and any number of SCells on licensed band.

Also in this case, the deactivation of any of the SCells can be performed using a fixed pre-defined time (e.g., 8 ms after receiving the command) since the UE does not need to use DRS for applying the deactivation procedure. However, for the activation procedure the UE uses DRS (e.g., PSS/SSS/CRS) for activating the first SCell and the second SCell.

On the first SCell, which is on an unlicensed band as described previously, due to the LBT procedure the DRS may not be consistently or periodically available at the UE in every predefined or preconfigured DRS occasion. But on the second SCell, which is on a licensed band, there is no LBT and therefore the DRS are consistently available at the UE without any interruption on every pre-defined or pre-configured DRS transmission occasions. For example, in the second SCell the PSS/SSS are available in every 5th subframe and CRS in every subframe at the UE. Due to different manners according to which the DRS are transmitted on the two SCells, the UE has to apply different SCell activation procedures for activating the first SCell and the second SCell. For example, the UE applies the first SCell activation procedure and the second SCell activation procedure for activating the first SCell and the second SCell respectively.

The first SCell activation procedure is the same as described for the first embodiment A above for the SCell on unlicensed band.

The second SCell activation procedure is the same as the existing SCell activation procedure as described in section "SCell Activation and deactivation delay requirements" for the SCell on the licensed band.

Thus, according to a second exemplary embodiment, the wireless device is capable of CA and is configured with a PCell. The wireless device is further configured with at least a first SCell operating on a CC belonging to an unlicensed band or spectrum and optionally configured with a second SCell operating on a CC belonging to a licensed band or spectrum. The method in the wireless device comprises receiving an SCell activation or deactivation command for activating or deactivating at least one of the first and second SCells, and activating the first SCell using a first activation procedure. The method optionally comprises activating the second SCell using a second activation procedure. The first activation procedure is performed over a variable time period (T0), provided at least N number of DL time resources containing DRS are available over T0, and the second activation procedure is performed over a pre-defined fixed time period (T1). DL time resources containing DRS may be, e.g., subframes or DRS occasions.

When the UE is configured with two or more SCells on unlicensed band(s) and/or two or more SCells on licensed band(s) then the total SCell activation delay for an SCell being activated is also extended as a function of number of times the other one or more SCells are activated, deactivated, configured or de-configured. In this case the delay may be extended based on any of the following principles:

In one example the first SCell activation delay may depend only on number of times (B) each of the SCells on unlicensed band is activated, deactivated, configured or de-configured while the first SCell is being activated. In this case the first SCell activation delay on the unlicensed band may be extended as a function of parameter, B, as described for the first embodiment A above. For example, if the second SCell previously activated is deactivated once during the period T0, then the first SCell activation delay, T0 (i.e. T0 of SCell1) will be extended by a margin (e.g., R*B=10 ms, where B=1).

In another example the second SCell activation delay may depend only on number of times (E) each of the SCells on licensed band is activated, deactivated, configured or de-configured while the second SCell is being activated. For example, in this case the first SCell activation delay on the licensed band may be extended as in existing solution.

In yet another example the first SCell activation delay may depend on both the number of times (B) each of the SCells on unlicensed band is activated, deactivated, configured or de-configured and number of times (E) each of the SCells on licensed band is activated, deactivated, configured or de-configured while the first SCell is being activated. For example, the SCell activation delay for any SCell may be extended by a margin (R). For example, the delay may be extended by: R×(B+E) or R1×B+R2×E, where R1 and R2 are margins for SCell on unlicensed and SCell on licensed bands respectively.

According to a third exemplary embodiment, the wireless device is capable of standalone unlicensed operation with at least first carrier belonging to an unlicensed band or spectrum and optionally with a second carrier operating on a CC belonging to a licensed band or spectrum. The method in the wireless device comprises receiving an SCell carrier activation or deactivation command for activating or deactivating at least one of two SCells in licensed band. The method optionally comprises performing cell search in unlicensed spectrum, and deciding to activate or deactivate at least one of the carriers in unlicensed band. The method further comprises activating the first SCell (i.e. the unlicensed carrier) using a first activation procedure and optionally activating the licensed carrier using a second activation procedure. The first activation procedure is performed over a variable time period (T0) provided at least N number of DL time resources containing DRS are available over T0, and the second activation procedure is performed over a pre-defined time period (T1). DL time resources containing DRS may be, e.g., subframes or DRS occasions.

3. Method in a Network Node of Adapting SCell or Unlicensed Carrier Activation/Deactivation Procedure Based on Type of Spectrum In accordance with the embodiments of methods in the wireless device, an embodiment of the method performed in the network node, comprises that the network node transmits an activation command to the wireless device for a serving SCell. The command initiates an activation procedure for the SCell operating on a CC, e.g., belonging to an unlicensed frequency band, performed by the wireless device. The activation procedure performed by the wireless device may after a variable time period result in the transmission of a CSI report for the activated SCell back to the network node, which is a confirmation that the SCell activation has succeeded. The variable time period is dependent on the time period needed for the wireless device to receive a minimum amount of DRS signals. The variable time period may thus vary with the current LBT situation and the SCell activation delay requirement may vary. When the network node receives the CSI reports confirming that the SCell is activated the network node may also initiate scheduling on the SCell.

According to further embodiments, the network node may determine a time to send an activation command to the wireless device, such that the wireless device may be able to perform the activation within a certain time period. The determining of the time to send the activation command may be based on, e.g., LBT statistics.

In embodiments, the network node may first determine whether the UE is configured with one or more SCells or unlicensed carriers on a CC belonging to an unlicensed band or spectrum. In case at least one SCell or unlicensed carrier to be activated by the network node is on a CC belonging to an unlicensed carrier, then the network node estimates or assesses an expected number (K) of the DL time resources (e.g., subframes, time slots, symbols etc.) containing discovery reference signal (DRS) that would be available at the UE over a time period T0 for activating the SCell or unlicensed carrier. Based on this determination the network node adapts the time instance at which it sends the SCell or unlicensed carrier activation/deactivation command to the UE for activating that SCell or unlicensed carrier.

This determination of the parameter, K, is based on for example the LBT procedure, which is to be applied by the network node on the SCell or unlicensed carrier to be activated. For example, if the LBT procedure is expected to make the network node needing to drop/suppress/not perform transmissions more frequently (e.g., every subframe) leading to the loss of several DRS occasion, then the network node may assume that K is below a threshold over T0. In this case the network node may delay in sending the SCell or unlicensed carrier activation/deactivation command to the UE. On the other hand of K is above a threshold over T0 then the network node may send the SCell or unlicensed carrier activation/deactivation command to the UE immediately or whenever there are DL resources (e.g., channel) for sending the command.

In another aspect of this embodiment the network node activates a SCell or unlicensed carrier when radio or channel conditions of the SCell are favorable, e.g., when interference estimated by the network node is below a threshold and/or signal quality (such as SINR) is above a threshold. This is because when radio or channel conditions are favorable, the LBT is less likely to fail and as a consequence the network node will be able to transmit the signals on the SCell or unlicensed carrier including the DRS. In this way the SCell or unlicensed carrier activation will be successfully done by the UE within a shorter or minimum possible delay (T0).

In yet another aspect of this embodiment when the network node determines that an SCell or unlicensed carrier is to be activated then it adapts the LBT procedure to avoid or minimize the loss of DRS transmission at least during time period, T0. For example, in this case whenever possible the network node applies the LBT procedure only in time resources (e.g., DL subframes) which will not result in loss of time resources containing DRS, which in turn are used by the UE for the activation of the SCell. Depending on the LBT procedure used at the network node, either the same subframe where LBT is applied and/or subsequent subframes may not be transmitted in case of LBT failure. This approach ensures that the UE is able to receive the maximum number of subframes with DRS during T0 and this leads to shorter T0 i.e. faster SCell or unlicensed carrier activation delay.

Figure 5:
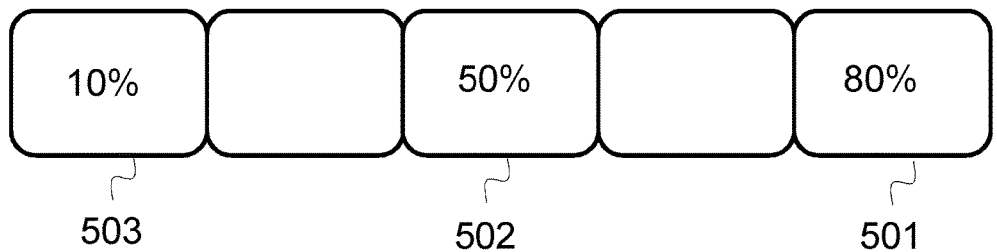
FIG. 5 is a schematic illustration of cells with different LBT success rates.

In another aspect, the PCell or network node gathers information about LBT output for unlicensed carriers, i.e. PCell or network node measures the channel occupancy of the LAA SCell, or the unlicensed carrier. Alternatively, The UE reports the channel occupancy to the PCell or network node, e.g., LBT statistics of LBT failures and/or success rate at the LAA node obtained over certain time period such as in the last 200 ms. The PCell or network node maintains a list of preferred LAA cells in some order. If PCell detects based on its buffer that a UE needs large DL or UL data transmission (i.e. a UE with lower capability), then the PCell instructs the UE to activate the SCell which has higher LBT success rate, i.e. in cell 501 or 502 with 80% or 50% LBT success rate as shown in FIG. 5. In cell 503 that has a lower LBT success rate of 10%, a higher capability UE can be activated instead. The LBT success rate is derived based on history, and is known to the PCell. An alternative to the LBT success rate is a channel occupancy rate.

Yet another criterion for activating the SCell is based on the load measurement such as in terms of total number of UEs in the SCell and/or signal quality such as SINR estimated by the network node or signal quality measurement results (e.g., RSRQ) received from the UE. For example, if cell load is low (e.g., SINR above a threshold, number of UEs below a threshold) then the network node sends the SCell activation/deactivation command to the UE for activating the SCell.

In another aspect of this invention, a UE may optionally report capability of maintaining synchronization (e.g., received timing) at a serving cell to the network node. This can be expressed for example in terms of required frequency for radio measurements or samples needed at the UE to maintain. Based on this received capability information, the network node (e.g., eNodeB) may select the most suitable SCell(s) for this UE to be activated. For example, the network node may send activation command for a SCell with higher utilization (i.e. on which load is high such as SINR below a threshold) to the UE with high capability in terms of maintaining synchronization. A UE with high capability can keep synchronization with the SCell based on sparse or fewer measurements. On the other hand, the network node may send activation command for a SCell with lower utilization (i.e. on which load is low such as SINR is not larger than a threshold) to the UE with low capability in terms of maintaining synchronization.

According to one exemplary embodiment, the network node is serving a wireless device configured with at least a first SCell operating on a CC belonging to an unlicensed band or spectrum. Alternatively, the network node is serving a wireless device configured with at least a first carrier operating on a CC belonging to an unlicensed band or spectrum. The method comprises estimating or determining an expected number (K) of DL time resources containing DRS that would be available at the UE over a time period T0. The estimation or determination may optionally for example be based on LBT statistics. The estimation or determination may also or alternatively be based on load or interference estimated on a carrier to be activated, e.g., statistics such as the channel occupancy level (how often the channel has been busy/non-busy) that has been recently observed by the network node. The method in the network node further comprises determining a time instance at which to send an SCell activation or deactivation command to the UE for activating or deactivating the first SCell, and sending or transmitting the SCell activation/deactivation command to the wireless device for activating the first SCell at the determined time instance.

Advantages of embodiments of the method in the network node is that the network node may be aware of wireless device performance (e.g., time to perform SCell or carrier activation/deactivation) at the time when the wireless device performs activation or deactivation of SCells or carriers in unlicensed spectrum.

Method and Node Embodiments Described with Reference to FIGS. 6-10

Figure 9:
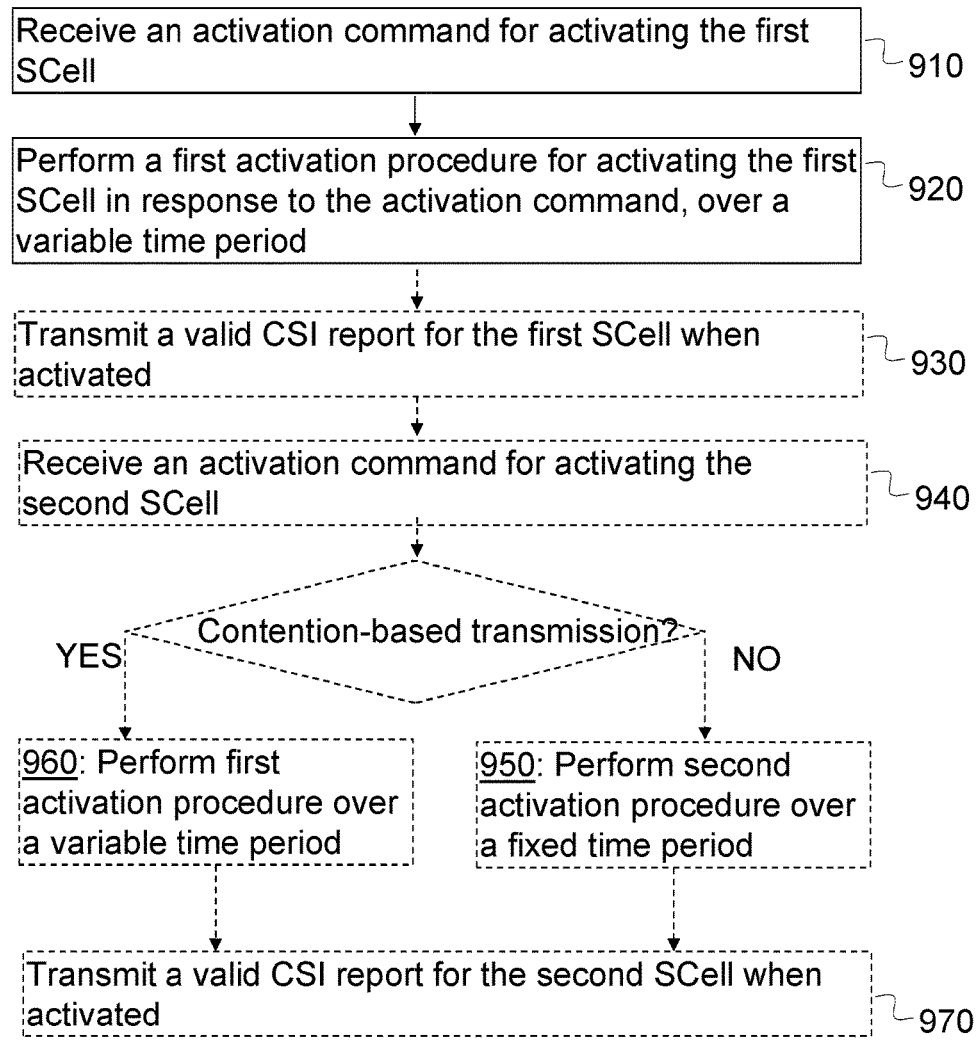
FIG. 9 is a flowchart illustrating a method in a wireless device according to embodiments of the invention.

FIG. 9 illustrates embodiments of a method performed in the wireless device. Example embodiments of this method has been described in section 2 above. The wireless device 850 is served by a network node 800 of a radio communications system. In embodiments, the wireless device may be served by more than one network node. This is the case e.g. for operation in a dual connectivity mode where a UE is served by two network nodes or eNodeBs as described in the background section. The network node features described herein may thus be distributed over more than one network node. The wireless device 850 is capable of carrier aggregation and is configured by the network node 800 with a primary cell, PCell, and a first secondary cell, SCell. The method comprises:

910: Receiving an activation command for activating the first SCell.

920: Performing a first activation procedure for activating the first SCell in response to the activation command, over a variable time period. The variable time period is increasing with a number of times that a discovery reference signal occasion of the first SCell is not available at the wireless device 850 during the first activation procedure. In embodiments, the discovery reference signal occasion of the first SCell is not available at the wireless device when the wireless device determines that at least one of a quality and a strength of a signal received in the discovery reference signal occasion is below a respective threshold level.

In embodiments of the invention, the method may optionally also comprise:

930: Transmitting a valid Channel State Information, CSI, report for the first SCell when activated during the first activation procedure. The valid CSI report may be a CSI report comprising a pre-defined Channel Quality Indicator, CQI, value with a non-zero CQI index. A CQI index equal to zero means that the CQI value is out of range.

In one embodiment, the first SCell is operating on a carrier for contention-based transmission. In the case of the radio communications system being a Long Term Evolution, LTE, system, the wireless device may be configured for License Assisted Access, LAA, operation on the first SCell. In such an example scenario, the activation command may be an SCell activation/deactivation Media Access Control, MAC, control element indicating that the first SCell is to be activated.

In embodiments, different activation procedures for an SCell may be selected based on whether the SCell operates on a CC which allows contention-based or contention-free transmission. When the wireless device 850 is configured by the network node 800 with a second SCell, the method may thus further comprise:

940: Receiving an activation command for activating the second SCell, and in response to the activation command for activating the second SCell, the wireless device may determine whether the second SCell operates on a CC which allows contention-based or contention-free transmission and decide what activation procedure to use depending on the outcome in the following way:

950: Performing a second activation procedure for activating the second SCell over a fixed time period when the second SCell is operating on a carrier for contention-free transmission. The fixed time period may be predefined.

960: Performing the first activation procedure for activating the second SCell over a variable time period increasing with a number of times that a discovery reference signal occasion of the second SCell is not available at the wireless device 850 during the first activation procedure, when the second SCell is operating on a carrier for contention-based transmission. This is thus the same activation procedure as was used for the first SCell above.

The method may also comprise:

970: Transmitting a valid CSI report for the second SCell when activated during the second or first activation procedure, in analogy with the activation of the first SCell.

Figure 6A:
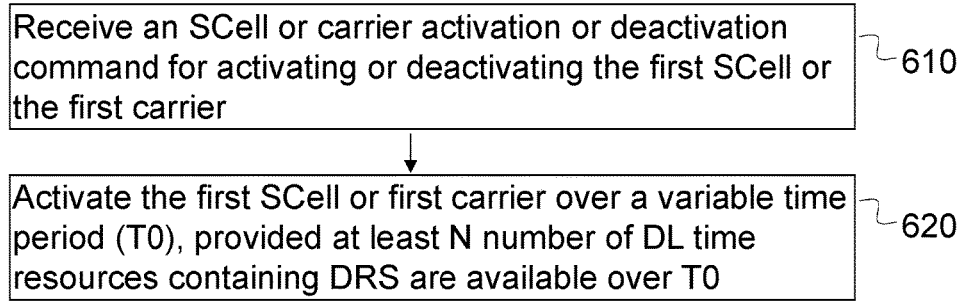
FIGS. 6a-b are flowcharts illustrating examples of the method in a wireless device.
Figure 6B:
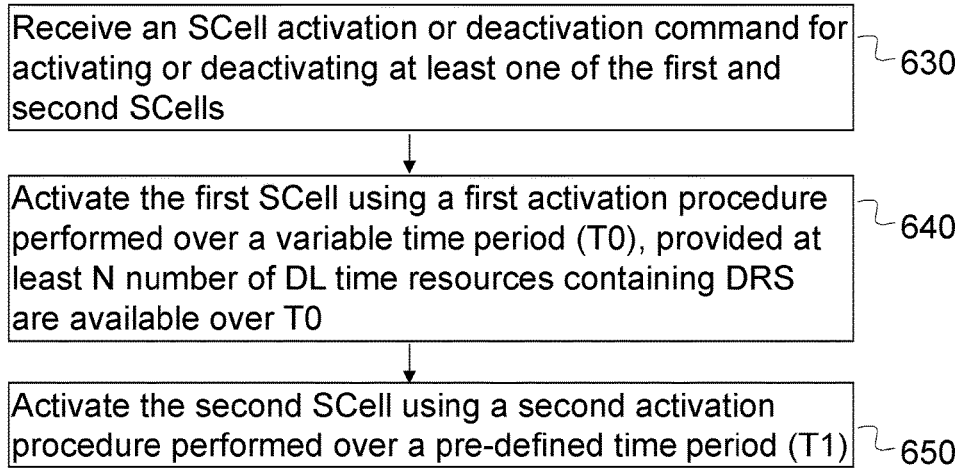

FIGS. 6a-b are flowcharts illustrating examples of the method in the wireless device.

In the example of FIG. 6a, the wireless device is capable of CA and is configured with a PCell. The wireless device is further configured with at least a first SCell operating on a CC belonging to an unlicensed frequency band or spectrum. The wireless device may be LAA capable or may be capable of standalone unlicensed operation. The method in the wireless device comprises receiving 610 an SCell or carrier activation or deactivation command for activating or deactivating the first SCell or the first carrier. The method further comprises activating 620 the first SCell or first carrier over a variable time period (T0), provided at least N number of DL time resources containing DRS are available over T0.

In the example of FIG. 6b, the wireless device is capable of CA and is configured with a PCell. The wireless device is further configured with at least a first SCell operating on a CC belonging to an unlicensed band or spectrum and a second SCell operating on a CC belonging to a licensed band or spectrum. The method in the wireless device comprises receiving 630 an SCell activation or deactivation command for activating or deactivating at least one of the first and second SCells, activating 640 the first SCell using a first activation procedure, and activating 650 the second SCell using a second activation procedure. The first activation procedure is performed over a variable time period (T0), provided at least N number of DL time resources containing DRS are available over T0, and the second activation procedure is performed over a pre-defined time period (T1).

Figure 10A:
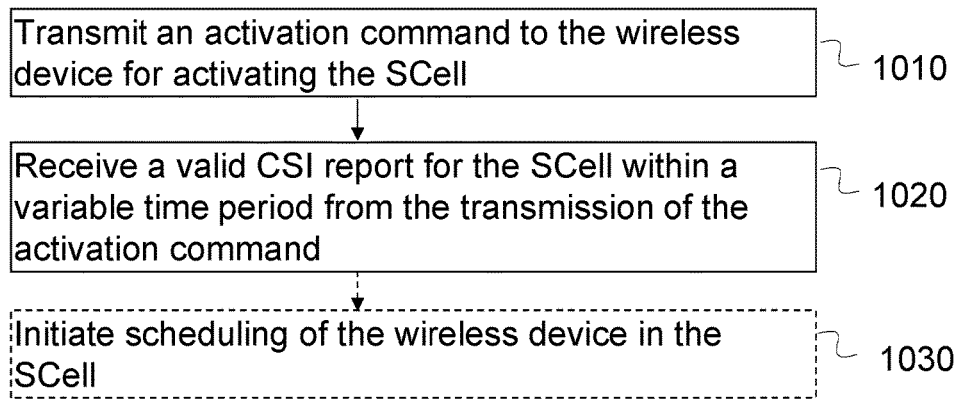
FIGS. 10a-b are flowcharts illustrating a method in a network node according to embodiments of the invention.
Figure 10B:
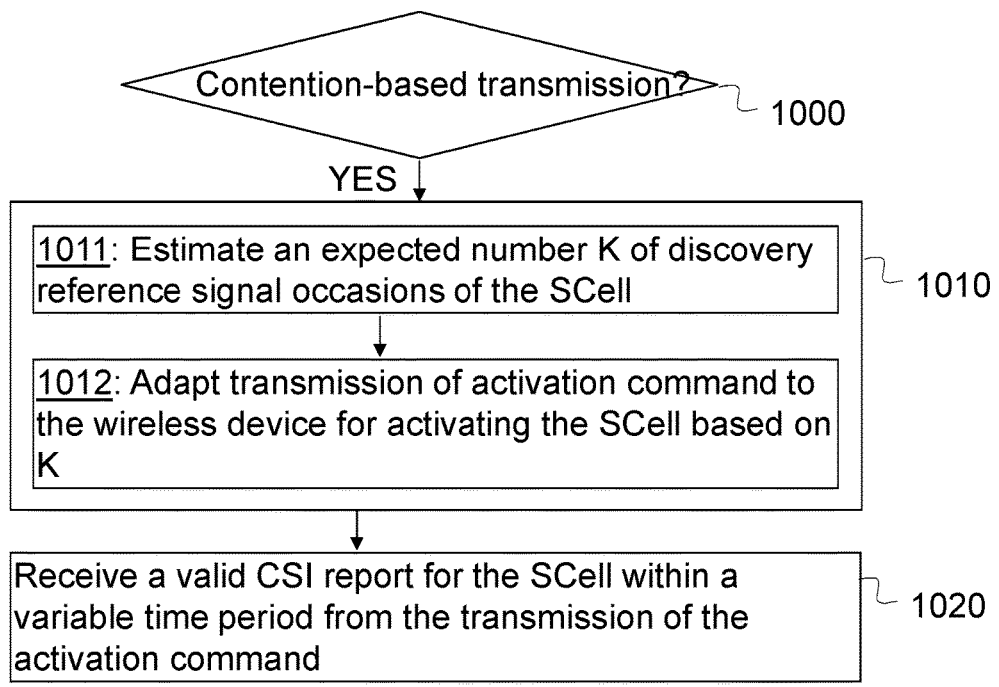

FIG. 10a-b illustrates embodiments of a method performed in the network node of a radio communications system. Example embodiments of this method has been described in section 3 above. The network node 800 is serving a wireless device 850 capable of carrier aggregation, wherein the wireless device 850 is configured with a primary cell, PCell, and a secondary cell, SCell. The method illustrated in FIG. 10a comprises:

1010: Transmitting an activation command to the wireless device 850 for activating the SCell.

1020: Receiving, from the wireless device 850, a valid Channel State Information, CSI, report for the SCell in response to the activation command. The CSI report is received within a variable time period from the transmission of the activation command, the variable time period increasing with a number of times that a discovery reference signal occasion of the SCell is not available at the wireless device 850. The valid CSI report may be a CSI report comprising a pre-defined Channel Quality Indicator, CQI, value with a non-zero CQI index.

In embodiments of the invention, the method may optionally further comprise:

1030: Initiating scheduling of the wireless device 850 in the SCell in response to the received valid CSI report. The received CSI reports indicates to the network node that the SCell has been activated and may be used for scheduling the wireless device.

In one embodiment, the SCell is operating on a carrier for contention-based transmission. In the case of the radio communications system being a Long Term Evolution, LTE, system, the wireless device may be configured for License Assisted Access, LAA, operation on the SCell. In such an example scenario, the activation command may be an SCell activation/deactivation Media Access Control, MAC, control element indicating that the SCell is to be activated.

Another embodiment is illustrated in FIG. 10b. In this embodiment, the method further comprises:

1000: Determining whether the SCell is operating on a carrier for contention-based transmission.

When it is determined, 1000/YES, that the SCell is operating on a carrier for contention-based transmission, transmitting 1010 the activation command further comprises:

1011: Estimating an expected number K of discovery reference signal occasions of the SCell available at the wireless device 850 over a time period for activating the SCell.

1012: Adapting the transmission of the activation command based on the expected number K. Adapting the transmission of the activation command may comprise delaying the transmission of the activation command when the expected number K is below a threshold, or performing the transmission as soon as there are downlink resources available for the transmission when the expected number K is equal to or above the threshold. The advantage of this embodiment is that the network node may adapt e.g. the timing for transmitting the activation command to the wireless device, such that it reaches the wireless device under the best possible conditions e.g. when the LBT procedure has a higher possibility to succeed for the SCell that is to be activated. Section 3 above gives a more detailed description of some alternatives.

1020: Receiving, from the wireless device 850, a valid Channel State Information, CSI, report for the SCell in response to the activation command. The CSI report is received within a variable time period from the transmission of the activation command, the variable time period increasing with a number of times that a discovery reference signal occasion of the SCell is not available at the wireless device 850.

In any of the embodiments of the method performed in the network node described above, the activation command may be transmitted when at least one of the following criteria is fulfilled for the SCell:
a load measure is below a load threshold,
a total number of wireless device (850)s in the SCell is below a device threshold,
an estimated interference level is below an interference threshold.

Figure 7:
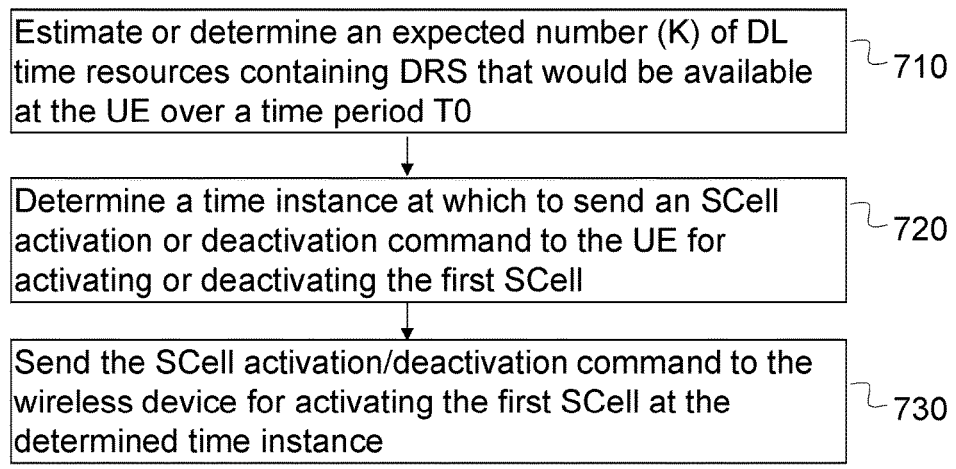
FIG. 7 is a flowchart illustrating an example of the method in a network node.

FIG. 7 is a flowchart illustrating one example of the method in the network node. In the example of FIG. 7, the network node is serving a wireless device configured with at least a first SCell operating on a CC belonging to an unlicensed band or spectrum. Alternatively, the network node is serving a wireless device configured with at least a first carrier operating on a CC belonging to an unlicensed band or spectrum. The method comprises estimating or determining 710 an expected number (K) of DL time resources containing DRS that would be available at the UE over a time period T0. The estimation or determination may optionally for example be based on LBT statistics. The estimation or determination may also or alternatively be based on load or interference estimated on a carrier to be activated, e.g., statistics such as the channel occupancy level (how often the channel has been busy/non-busy) that has been recently observed by the network node. The method in the network node further comprises determining 720 a time instance at which to send an SCell activation or deactivation command to the UE for activating or deactivating the first SCell, and sending or transmitting 730 the SCell activation/deactivation command to the wireless device for activating the first SCell at the determined time instance.

Figure 8:
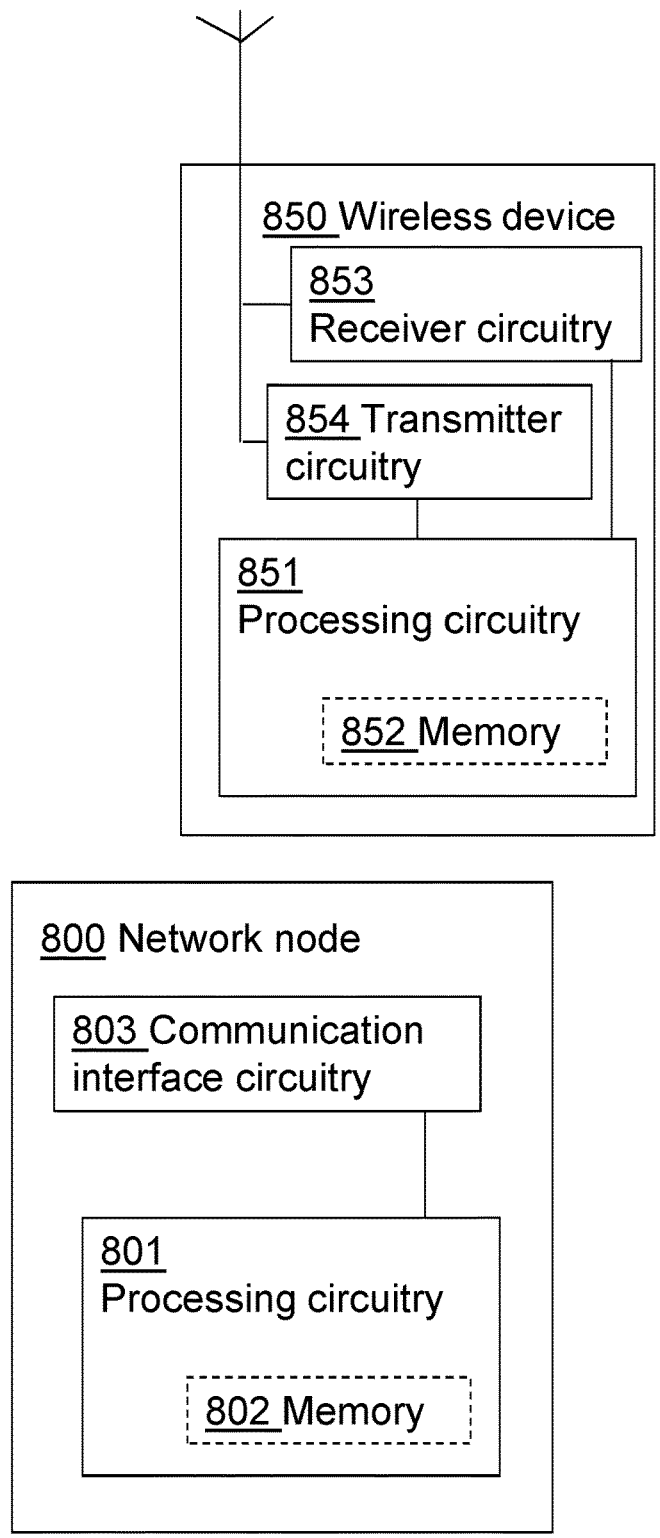
FIG. 8 is a block diagram schematically illustrating a network node and a wireless device according to embodiments of the invention.

An embodiment of a network node 800 and a wireless device 850 of a radio communications system is schematically illustrated in the block diagram in FIG. 8.

The wireless device 850 is configured to be served by the network node 800 of the radio communications system. The wireless device 850 is capable of carrier aggregation and is configured with a primary cell, PCell, and a first secondary cell, SCell. The wireless device 850 is further configured to receive an activation command for activating the first SCell, and perform a first activation procedure for activating the first SCell in response to the activation command, over a variable time period increasing with a number of times that a discovery reference signal occasion of the first SCell is not available at the wireless device 850 during the first activation procedure.

In embodiments, the wireless device 850 is further configured to transmit a valid Channel State Information, CSI, report for the first SCell when activated during the first activation procedure. The valid CSI report may be a CSI report comprising a pre-defined Channel Quality Indicator, CQI, value with a non-zero CQI index.

In embodiments, the wireless device 850 may be configured to determine at least one of a quality or a strength of a signal received in the discovery reference signal occasion. The discovery reference signal occasion of the first SCell is not available at the wireless device 850 when the wireless device 850 determines that the at least one of the quality and the strength of the signal received in the discovery reference signal occasion is below a respective threshold level.

The wireless device 850 may be configured with the first SCell operating on a carrier for contention-based transmission. In one embodiment, the radio communications system may be a Long Term Evolution, LTE, system, and the wireless device 850 may be configured for License Assisted Access, LAA, operation on the first SCell. In such an embodiment, the activation command may be an SCell activation/deactivation Media Access Control, MAC, control element indicating that the first SCell is to be activated.

In one embodiment, the wireless device 850 may be further configured with a second SCell. The wireless device is also configured to receive an activation command for activating the second SCell, and in response to the activation command for activating the second SCell to:

perform a second activation procedure for activating the second SCell over a fixed time period when the second SCell is operating on a carrier for contention-free transmission. The fixed time period may be predefined.

The wireless device may also be configured to transmit a valid channel state information, CSI, report for the second SCell when activated during the second activation procedure.

When the second SCell is instead operating on a carrier for contention-based transmission, the wireless device will in response to the activation command for activating the second SCell instead perform the first activation procedure for activating the second SCell over a variable time period increasing with a number of times that a discovery reference signal occasion of the second SCell is not available at the wireless device (850) during the first activation procedure, as described above.

The wireless device 850 in FIG. 8 may in embodiments comprise a receiver circuitry 853 and a transmitter circuitry 854 adapted to communicate with the network and the network node. The receiver and transmitter circuitry may be connected via one or more antenna ports to a same or to different transmitting/receiving antennas. The wireless device 850 may also comprise control circuitry, or a processing circuitry 851 comprising a memory 852. The control circuitry is connected to the transmitter and receiver circuitry, which provide receiver and transmitter functionality. The wireless device 850 may be adapted to carry out any of the methods performed by the wireless device disclosed herein. The memory 852 may comprise instructions executable by said processing circuitry 851 whereby said wireless device 850 is operative to perform the methods described herein.

The wireless device 850 may thus comprise a processing circuitry 851 and a memory 852, the memory 852 comprising instructions executable by said processing circuitry 851, whereby the wireless device 850 may be operative to receive an activation command, via the receiver circuitry, for activating the first SCell. The wireless device may be further operative to perform a first activation procedure for activating the first SCell in response to the activation command, over a variable time period increasing with a number of times that a discovery reference signal occasion of the first SCell is not available at the wireless device 850 during the first activation procedure.

Furthermore, the wireless device 850 may comprise a Central Processing Unit (CPU) which may be a single unit or a plurality of units, and at least one computer program product (CPP) in the form of a non-volatile memory, e.g., an EEPROM (Electrically Erasable Programmable Read-Only Memory), a flash memory or a disk drive. The CPP comprises a computer program, which comprises code means which when run on the wireless device 850 causes the CPU to perform steps of the procedure described earlier in conjunction with FIG. 6*a-b* or 9. In other words, when said code means are run on the CPU, they correspond to the processing circuitry 851.

In an alternative way to describe the wireless device 850, the wireless device 850 may comprise a receiving module adapted to receive an activation command for activating the first SCell. The wireless device 850 may also comprise a performing module adapted to perform a first activation procedure for activating the first SCell in response to the activation command, over a variable time period increasing with a number of times that a discovery reference signal occasion of the first SCell is not available at the wireless device (850) during the first activation procedure.

FIG. 8 also illustrates the network node 800 for a radio communications system. The network node 800 is configured to serve the wireless device 850 capable of carrier aggregation. The wireless device 850 is configured with a primary cell, PCell, and a secondary cell, SCell. The network node 800 is further configured to transmit an activation command to the wireless device 850 for activating the SCell. The network node 800 is also configured to receive, from the wireless device 850, a valid Channel State Information, CSI, report for the SCell in response to the activation command, wherein the CSI report is received within a variable time period from the transmission of the activation command, the variable time period increasing with a number of times that a discovery reference signal occasion of the SCell is not available at the wireless device 850. The valid CSI report may be a CSI report comprising a pre-defined Channel Quality Indicator, CQI, value with a non-zero CQI index.

The network node 800 may be further configured to initiate scheduling of the wireless device (850) in the SCell in response to the received valid CSI report.

In one embodiment, the network node 800 may be adapted to configure the wireless device 850 with the SCell operating on a carrier for contention-based transmission. The network node 800 may be configured for an LTE system, and for serving the wireless device 850 configured for License Assisted Access, LAA, operation on the SCell. The activation command may in this embodiment be an SCell activation/deactivation Media Access Control, MAC, control element indicating that the first SCell is to be activated.

The network node 800 may be further configured to determine whether the SCell is operating on a carrier for contention-based transmission, and to transmit the activation command when it is determined that the SCell is operating on a carrier for contention-based transmission by being configured to estimate an expected number K of discovery reference signal occasions of the SCell available at the wireless device (850) over a time period for activating the SCell, and adapt the transmission of the activation command based on the expected number K.

In one embodiment, the network node 800 may be further configured to adapt the transmission of the activation command by being configured to delay the transmission of the activation command when the expected number K is below a threshold, or perform the transmission as soon as there are downlink resources available for the transmission when the expected number K is equal to or above the threshold.

In embodiment, the network node 800 may be configured to transmit the activation command when at least one of the following criteria is fulfilled for the SCell: a load measure is below a load threshold; a total number of wireless device (850)s in the SCell is below a device threshold; an estimated interference level is below an interference threshold.

The network node 800 may in embodiments comprise a communication interface circuitry 803 which may e.g. be configured for communicating with the wireless device. If the network node is an eNodeB, the communication interface circuitry 803 may comprise a transceiver which may be connected via an antenna port to a same or to different transmitting/receiving antennas. The network node may also comprise control circuitry, or a processing circuitry 801 connected to a memory 802. The control circuitry is connected to the communication interface circuitry 803, which may, e.g., provide receiver and transmitter and/or transceiver functionality. The network node 800 may be adapted to carry out any of the methods performed by the network node disclosed herein. The memory 802 may comprise instructions executable by said processing circuitry 801 whereby said network node 800 is operative to perform the methods described herein.

The network node 800 may thus comprise a processing circuitry 801 and a memory 802, the memory 802 comprising instructions executable by said processing circuitry 801, whereby the network node 800 may be operative to transmit an activation command, via the communication interface circuitry 803, to the wireless device 850 for activating the SCell. The network node 800 may be further operative to receive, from the wireless device 850, a valid Channel State Information, CSI, report for the SCell in response to the activation command, wherein the CSI report is received within a variable time period from the transmission of the activation command, the variable time period increasing with a number of times that a discovery reference signal occasion of the SCell is not available at the wireless device.

In an alternative way to describe the embodiment in FIG. 8, the network node 800 comprises a Central Processing Unit (CPU) which may be a single unit or a plurality of units. Furthermore, the network node 800 comprises at least one computer program product (CPP) in the form of a non-volatile memory, e.g., an EEPROM (Electrically Erasable Programmable Read-Only Memory), a flash memory or a disk drive. The CPP comprises a computer program, which comprises code means which when run on the network node 800 causes the CPU to perform steps of the procedure described earlier in conjunction with FIG. 10a-b or 7. In other words, when said code means are run on the CPU, they correspond to the processing circuitry 801 of FIG. 8.

In an alternative way to describe the network node 800, the network node 800 may comprise a transmitting module adapted to transmit an activation command to the wireless device 850 for activating the first SCell. The network node 800 may also comprise a receiving module adapted to receive, from the wireless device 850, a valid Channel State Information, CSI, report for the SCell in response to the activation command, wherein the CSI report is received within a variable time period from the transmission of the activation command, the variable time period increasing with a number of times that a discovery reference signal occasion of the SCell is not available at the wireless device.

The modules described above are functional units which may be implemented in hardware, software, firmware or any combination thereof. In one embodiment, the modules are implemented as a computer program running on a processor.

The above mentioned and described embodiments are only given as examples and should not be limiting. Other solutions, uses, objectives, and functions within the scope of the accompanying patent claims may be possible.

The invention claimed is:

1. A method performed in a wireless device served by a network node of a radio communications system, the wireless device being capable of carrier aggregation and being configured by the network node with a primary cell, PCell, and a first secondary cell, SCell, the method comprising:
   receiving an activation command for activating the first SCell, the first SCell operating on a carrier for contention-based transmission; and
   activating the first SCell in response to the activation command within a variable time period, the variable timer period increasing with a number of times that a discovery reference signal occasion of the first SCell is not available at the wireless device during the activation, the discovery reference signal occasion of the first SCell is not available when at least one of a quality and a strength of a signal received in the discovery reference signal occasion is below a respective threshold.

2. The method according to claim 1, further comprising:
   transmitting a valid Channel State Information, CSI, report for the first SCell, the transmission of the valid CSI report confirming the activation of the first SCell.

3. The method according to claim 2, wherein the valid CSI report is a CSI report comprising a pre-defined Channel Quality Indicator, CQI, value with a non-zero CQI index.

4. The method according to claim 1, wherein the radio communications system is a Long Term Evolution, LTE, system, and the wireless device is configured for License Assisted Access, LAA, operation on the first SCell.

5. The method according to claim 4, wherein the activation command is an SCell activation/deactivation Media Access Control, MAC, control element indicating that the first SCell is to be activated.

6. The method according to claim 1, wherein the wireless device is configured by the network node with a second SCell operating on a carrier for contention-free transmission, the method further comprising:
   receiving an activation command for activating the second SCell, and in response to the activation command for activating the second SCell:
   activating the second SCell within a fixed time period; and
   transmitting a valid CSI report for the second SCell, the transmission of the valid CSI report confirming the activation of the SCell.

7. The method according to claim 6, wherein the fixed time period is predefined.

8. A method performed in a network node of a radio communications system, the network node serving a wireless device capable of carrier aggregation, the wireless device being configured with a primary cell, PCell, and a secondary cell, SCell, the method comprising:
   transmitting an activation command to the wireless device for activating the SCell the SCell operating on a carrier for contention-based transmission; and
   receiving, from the wireless device, a valid Channel State Information, CSI, report for the SCell in response to the activation command, the CSI report being received within a variable time period from the transmission of the activation command, the variable time period increasing with a number of times that a discovery reference signal occasion of the SCell is not available at the wireless device as a discovery reference signal in the discovery reference signal occasion is not transmitted due to a listen-before-talk procedure.

9. The method according to claim 8, wherein the valid CSI report is a CSI report comprising a pre-defined Channel Quality Indicator, CQI, value with a non-zero CQI index.

10. The method according to claim 8, further comprising:
   initiating scheduling of the wireless device in the SCell in response to the received valid CSI report.

11. The method according to claim 8, wherein the radio communications system is a long term evolution, LTE, system, and the wireless device is configured for License Assisted Access, LAA, operation on the SCell.

12. The method according to claim 11, wherein the activation command is an SCell activation/deactivation Media Access Control, MAC, control element indicating that the first SCell is to be activated.

13. The method according to claim 8,
   wherein transmitting the activation command further comprises:
      estimating an expected number K of discovery reference signal occasions of the SCell available at the wireless device over a time period for activating the SCell; and
      adapting the transmission of the activation command based on the expected number K.

14. The method according to claim 13, wherein adapting the transmission of the activation command comprises:
   delaying the transmission of the activation command when the expected number K is below a threshold; and
   performing the transmission as soon as there are downlink resources available for the transmission when the expected number K is equal to or above the threshold.

15. The method according to claim 8, wherein the activation command is transmitted when at least one of the following criteria is fulfilled for the SCell:
   a load measure is below a load threshold;
   a total number of wireless devices in the SCell is below a device threshold; and
   an estimated interference level is below an interference threshold.

16. A wireless device configured to be served by a network node of a radio communications system, the wireless device being capable of carrier aggregation and being configured with a primary cell, PCell, and a first secondary cell, SCell, the wireless device being further configured to:
   receive an activation command for activating the first SCell, the first SCell operating on a carrier for contention-based transmission; and
   activate the first SCell in response to the activation command, within a variable time period, the variable time period increasing with a number of times that a discovery reference signal occasion of the first SCell is not available at the wireless device during the activation, the discovery reference signal occasion of the first SCell is not available when at least one of a quality and a strength of a signal received in the discovery reference signal occasion is below a respective threshold level.

17. The wireless device according to claim 16, further configured to:
   transmit a valid Channel State Information, CSI, report for the first SCell, the transmission of the valid CSI report confirming the activation of the first SCell.

18. The wireless device according to claim 17, wherein the valid CSI report is a CSI report comprising a pre-defined Channel Quality Indicator, CQI, value with a non-zero CQI index.

19. The wireless device according to claim 16, wherein the radio communications system is a Long Term Evolution, LTE, system, and the wireless device is configured for License Assisted Access, LAA, operation on the first SCell.

20. The wireless device according to claim 19, wherein the activation command is an SCell activation/deactivation Media Access Control, MAC, control element indicating that the first SCell is to be activated.

21. The wireless device according to claim 16, further configured with a second SCell operating on a carrier for contention-free transmission, and configured to:
   receive an activation command for activating the second SCell, and in response to the activation command for activating the second SCell:
      activate the second SCell over within a fixed time period; and
   transmit a valid channel state information, CSI, report for the second SCell, the transmission of the valid CSI report confirming the activation of the second SCell.

22. The wireless device according to claim 21, wherein the fixed time period is predefined.

23. A network node for a radio communications system, the network node being configured to serve a wireless device capable of carrier aggregation, the wireless device being configured with a primary cell, PCell, and a secondary cell, SCell, the network node being further configured to:
   transmit an activation command to the wireless device for activating the SCell, the SCell operating on a carrier for contention-based transmission; and
   receive, from the wireless device, a valid Channel State Information, CSI, report for the SCell in response to the activation command, wherein the CSI report is received within a variable time period from the transmission of the activation command, the variable time period increasing with a number of times that a discovery reference signal occasion of the SCell is not available at the wireless device as a discovery reference signal of the discovery reference signal occasion is not transmitted due to a listen-before-talk procedure.

24. The network node according to claim 23, wherein the valid CSI report is a CSI report comprising a pre-defined Channel Quality Indicator, CQI, value with a non-zero CQI index.

25. The network node according to claim 23, further configured to:
   initiate scheduling of the wireless device in the SCell in response to the received valid CSI report.

26. The network node according to claim 23, configured for the radio communications system being a long term evolution, LTE, system, and for serving the wireless device configured for License Assisted Access, LAA, operation on the SCell.

27. The network node according to claim 26, wherein the activation command is an SCell activation/deactivation Media Access Control, MAC, control element indicating that the first SCell is to be activated.

28. The network node according to claim 23, further configured to:
   transmit the activation command by being configured to:
      estimate an expected number K of discovery reference signal occasions of the SCell available at the wireless device over a time period for activating the SCell; and
      adapt the transmission of the activation command based on the expected number K.

29. The network node according to claim 28, configured to adapt the transmission of the activation command by being configured to:
   delay the transmission of the activation command when the expected number K is below a threshold; and perform the transmission as soon as there are downlink resources available for the transmission when the expected number K is equal to or above the threshold.

30. The network node according to claim 23, configured to transmit the activation command when at least one of the following criteria is fulfilled for the SCell:
 a load measure is below a load threshold;
 a total number of wireless devices in the SCell is below a device threshold; and
 an estimated interference level is below an interference threshold.

* * * * *